US012170883B2

(12) United States Patent
Marculescu et al.

(10) Patent No.: US 12,170,883 B2
(45) Date of Patent: Dec. 17, 2024

(54) SPATIAL AUDIO FOR WEARABLE DEVICES

(71) Applicant: GOOGLE LLC, Mountain View, CA (US)

(72) Inventors: Mugur Marculescu, Palo Alto, CA (US); John D. Muir, Foster City, CA (US); Pierric Gimmig, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 194 days.

(21) Appl. No.: 17/636,958

(22) PCT Filed: Oct. 21, 2020

(86) PCT No.: PCT/US2020/056577
§ 371 (c)(1),
(2) Date: Feb. 21, 2022

(87) PCT Pub. No.: WO2021/081035
PCT Pub. Date: Apr. 29, 2021

(65) Prior Publication Data

US 2022/0279303 A1 Sep. 1, 2022

Related U.S. Application Data

(60) Provisional application No. 62/924,262, filed on Oct. 22, 2019.

(51) Int. Cl.
*H04S 7/00* (2006.01)
*H04R 5/033* (2006.01)
*H04R 5/04* (2006.01)

(52) U.S. Cl.
CPC ............. *H04S 7/304* (2013.01); *H04R 5/033* (2013.01); *H04R 5/04* (2013.01); *H04S 2400/11* (2013.01)

(58) Field of Classification Search
CPC ...... H04S 7/304; H04S 2400/11; H04S 7/303; H04S 2400/01; H04R 5/033; H04R 5/04; H04R 25/552; H04R 2201/109
(Continued)

(56) References Cited

U.S. PATENT DOCUMENTS

2003/0076973 A1 4/2003 Yamada
2015/0088500 A1 3/2015 Conliffe
(Continued)

FOREIGN PATENT DOCUMENTS

JP H08107600 A 4/1996
WO 2017/191631 A1 11/2017

OTHER PUBLICATIONS

International Search Report and Written Opinion mailed Jan. 27, 2021 for corresponding International Application No. PCT/US2020/056577, 15 pages.
(Continued)

*Primary Examiner* — Vivian C Chin
*Assistant Examiner* — Douglas J Suthers

(57) ABSTRACT

Spatial audio is rendered at a companion device or server connected to a wearable device, where the spatial audio is rendered based on a first pose estimate of the wearable device that is estimated at the companion device or server. The rendered spatial audio is then transmitted to the wearable device. The rendered spatial audio is refined at the wearable device based on a second pose estimate of the wearable device that is estimated at the wearable device. The refined spatial audio is then provided for playback via speakers of the wearable device.

23 Claims, 6 Drawing Sheets

(58) Field of Classification Search
USPC .......................................... 381/303, 334, 79
See application file for complete search history.

(56) References Cited

U.S. PATENT DOCUMENTS

| | | | | |
|---|---|---|---|---|
| 2015/0382130 | A1 | 12/2015 | Connor et al. | |
| 2017/0078825 | A1 | 3/2017 | Mangiat et al. | |
| 2017/0257724 | A1 | 9/2017 | Bosnjak et al. | |
| 2018/0035234 | A1 | 2/2018 | Roach et al. | |
| 2018/0077513 | A1 | 3/2018 | Link | |
| 2018/0220253 | A1* | 8/2018 | Kärkkäinen | H04R 5/033 |
| 2018/0310116 | A1 | 10/2018 | Arteaga et al. | |
| 2019/0064519 | A1 | 2/2019 | Ben-Asher et al. | |

OTHER PUBLICATIONS

Translation of Chinese Office Action mailed Aug. 10, 2023 for CN Application No. 202080047687.8, 35 pages.
International Preliminary Report on Patentability mailed May 5, 2022 for PCT/US2020/056577, 9 pages.
European Office Action mailed Dec. 11, 2023 for EP Application No. 20804737.3, 5 pages.
Translation of Chinese Office Action mailed Feb. 27, 2024 for CN Application No. 202080047687.8 24 pages.
Translation of Chinese Notice of Allowance mailed Jun. 13, 2024 for CN Application No. 202080047687.8, 6 pages.

* cited by examiner

SPATIAL AUDIO FOR WEARABLE DEVICES

CROSS-REFERENCE TO RELATED APPLICATIONS

The present application is a U.S. National Stage under 35 U.S.C. § 371 of International Patent Application Serial No. PCT/US2020/056577, entitled "SPATIAL AUDIO FOR WEARABLE DEVICES" and filed on 21 Oct. 2020, which claims priority to U.S. Provisional Application No. 62/924,262, entitled "SPATIAL AUDIO FOR WEARABLE DEVICES" and filed on 22 Oct. 2019, the entireties of which are incorporated by reference herein.

BACKGROUND

To provide a more accurate, immersive, or enjoyable user experience, some head-mounted display devices include spatial audio features, which utilize speakers that generate sound for the user. Spatial audio refers to sound that is reproduced by a device such that a listener perceives the sound as coming from a particular or approximate direction. Spatial audio rendering techniques have various applications such as in virtual reality (VR) or augmented reality (AR) systems, navigation systems or other travel aids, and real time aviation systems.

Without any mitigations, wireless audio-enabled glasses or other head-worn accessory devices that include a motion sensor and speakers can have latency between detection of motion and playback of spatial audio in the range of 400 milliseconds (ms) when utilizing a remote device to perform computational operations associated with rendering the spatial audio. This can have a negative impact on the user experience, particularly for implementations in which the sound is used to guide the user or respond to user movement.

SUMMARY

According to an aspect, a method comprising:

with a wearable device, receiving spatial audio data and a first pose estimate corresponding to the wearable device;

with the wearable device, generating a second pose estimate corresponding to the wearable device;

with the wearable device, refining the spatial audio data based on the second pose estimate; and with the wearable device, producing sound based on the refined spatial audio data.

According to some aspects, the method may comprise one or more (e.g., all) of the following features (or any combination thereof).

The method may comprise: with a motion sensor of the wearable device, generating first pose metadata during a first time period, wherein the first pose estimate is generated based on the first pose metadata. The method may further comprise with the motion sensor, generating second pose metadata during a second time period, wherein the wearable device generates the second pose estimate based on the second pose metadata. The method may further comprise: with a motion sensor of the wearable device, generating first pose metadata during a first time period; and with a camera of a mobile device, generating second pose metadata during the first time period, wherein the mobile device generates the first pose estimate based on the first pose metadata and the second pose metadata. The method may further comprise: with the motion sensor, generating third pose metadata during a second time period, wherein the wearable device generates the second pose estimate based on the third pose metadata. Further, refining the spatial audio data may comprise calculating a local spatial audio transform having a local coordinate reference frame based on a global spatial audio transform having a global coordinate reference frame and the second pose estimate, wherein the global spatial audio transform may be indicative of a location and orientation at which an audio source is to be emulated upon reproduction of the spatial audio data in world space.

According to an aspect a system comprising:

a wearable device comprising:

a processor configured to execute computer-readable instructions that, when executed, cause the processor to:

receive spatial audio data that corresponds to a first pose estimate of the wearable device;

generate refined spatial audio data by modifying the spatial audio data based on a second pose estimate of the wearable device; and produce sound based on the refined spatial audio data.

According to another aspect a system comprising:

a wearable device comprising:

a processor configured to execute computer-readable instructions that, when executed, cause the processor to:

receive spatial audio data and a first pose estimate corresponding to the wearable device;

generate a second pose estimate corresponding to the wearable device;

refine the spatial audio data based on the second pose estimate; and produce sound based on the refined spatial audio data.

According to some aspects, one or both of the two aforementioned systems may comprise one or more (e.g., all) of the following features (or any combination thereof). The wearable device may comprise a motion sensor configured to generate first pose metadata during a first time period, wherein the first pose estimate is generated based on the first pose metadata. The motion sensor may be further configured to generate second pose metadata during a second time period, wherein the processor generates the second pose estimate based on the second pose metadata. The system may further comprise: a companion device comprising a camera, wherein companion device is configured to: generate second pose metadata during the first time period, the second pose metadata comprising image data captured by the camera during the first time period; and generate the first pose estimate based on the first pose metadata and the second pose metadata. The motion sensor may be further configured to generate third pose metadata during a second time period, wherein the processor generates the second pose estimate based on the third pose metadata. Also, the second time period may begin immediately after the first time period.

According to an aspect, a system comprising:

a first device comprising:

a first processor configured to execute computer-readable instructions that, when executed, cause the first processor to:

generate a first pose estimate; and render spatial audio data based on the first pose estimate;

a second device comprising:

a second processor configured to execute computer-readable instructions that, when executed, cause the second processor to:

generate first refined spatial audio data based on a second pose estimate, wherein the first pose estimate and the second pose estimate respectively correspond to at least one pose of the second device; and produce sound based on the first refined spatial audio data.

According to some aspects, the system may comprise one or more (e.g., all) of the following features (or any combination thereof). The second device may further comprise: a motion sensor configured to generate first pose metadata during a first time period, wherein the first processor is configured to generate the first pose estimate based on the first pose metadata. The motion sensor may be further configured to generate second pose metadata during a second time period, wherein the second processor is configured to generate the second pose estimate based on the second pose metadata. The system may further comprise: a third device comprising: a third processor configured to generate computer-readable instructions which, when executed, cause the third processor to: generate second refined spatial audio data by refining the spatial audio data generated by the first processor based on a third pose estimate corresponding to the second device, wherein the first refined spatial audio data is generated by the second processor by refining the second refined spatial audio data. The motion sensor may be further configured to generate third pose metadata during a third time period, wherein the third processor is configured to generate the third pose estimate based on the third pose metadata. The third time period may occur between the first time period and the second time period. Further, the first device may be a wearable device, the second device may be a server, the third device may be a mobile device, and the wearable device may be communicatively coupled to the server and the mobile device.

According to an aspect a wearable device comprising:

speakers; and a processor configured to execute computer-readable instructions which, when executed, cause the processor to:

receive a sound identifier, a spatial location, and a first pose estimate corresponding to the wearable device;

update the first pose estimate to generate a second pose estimate;

render spatial audio data based on the sound identifier, the spatial location, and the second pose estimate; and cause the speakers to produce sound corresponding to the spatial audio data.

According to another aspect a wearable device comprising:

speakers; and a processor configured to execute computer-readable instructions which, when executed, cause the processor to:

receive spatial audio data and a first pose estimate corresponding to the wearable device;

generate a second pose estimate corresponding to the wearable device;

refine the spatial audio data based on the second pose estimate; and cause the speakers to produce sound based on the refined spatial audio data.

According to some aspects, one or both of the two aforementioned systems may comprise one or more (e.g., all) of the following features (or any combination thereof). The wearable device may further comprise: a motion sensor configured to: generate first pose metadata during a first time period, wherein the first pose metadata is indicative of movement of the wearable device during the first time period, and wherein the first pose estimate is generated based on the first pose metadata; and generate second pose metadata during a second time period that follows the first time period, wherein the second pose metadata is indicative of movement of the wearable device during the second time period, and wherein the second pose estimate is generated based on the second pose metadata. The sound identifier may identify audio data stored at the wearable device, and wherein rendering the spatial audio data may comprise spatializing the identified audio data based on the spatial location and the second pose estimate. The spatial audio data may cause the speakers, when producing the sound corresponding to the spatial audio data, to emulate projection of the sound at the spatial location, wherein the spatial location may be defined with respect to a pose of the wearable device that is indicated by the second pose estimate.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
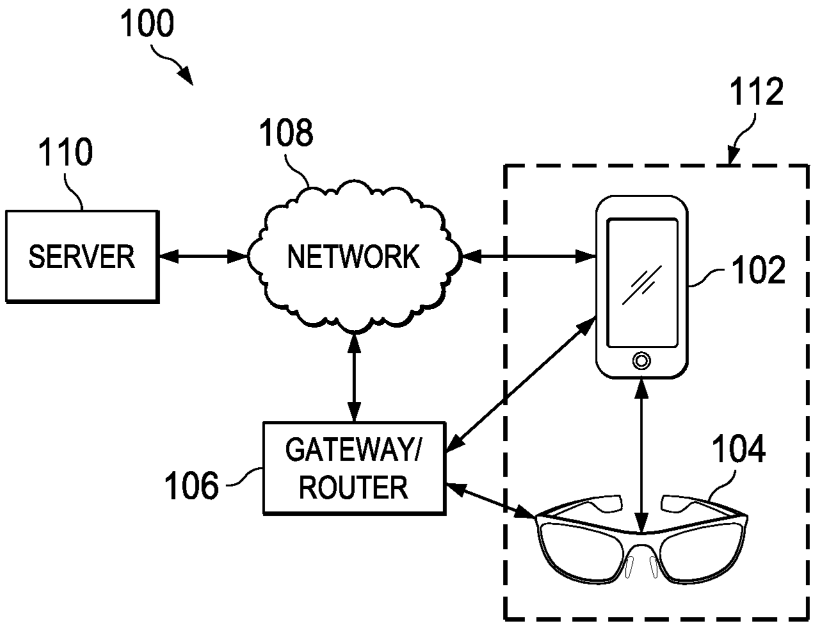
FIG. 1 is a block diagram of a distributed processing environment that includes a wearable device, a companion device, and a remote server, in accordance with some embodiments.

Techniques described herein in connection with FIGS. 1-8 relate to mechanisms to reduce the latency of motion-to-audio output for wearable user devices employing spatial audio, particularly in instances where the rendering and transmission of the spatial audio through wireless or other means introduces significant latencies (e.g., latencies of around hundreds of ms or more), since the accuracy of the reproduction of spatial audio will degrade rapidly between the time at which the spatial audio data is rendered and the time at which the spatial audio data is reproduced due to potential changes in user or device pose during the delay period. Spatial audio rendering techniques described herein can include binaural rendering techniques such as stereo panning or three-dimensional (3D) sound synthesis techniques, which may be based on head-related transfer function (HRTF) models.

Generally, to render spatial audio to emulate a sound source at a particular location with respect to a wearable device, the device that renders the spatial audio requires an estimate of the pose (i.e., orientation in 3D space) of the user or of the wearable device, and the pose may be estimated based on pose metadata, which may include image data, motion data, or acceleration data indicative of changes in the pose of the user or wearable device during a given time period, or one or more derivations thereof. In some embodiments, pose metadata may also include timestamps and time synchronization information between the wearable device and one or more other devices (e.g., mobile devices and/or remote servers) that perform spatial audio rendering or refinement processes for the wearable device. For example, each entry of image data, motion data, audio data, or acceleration data may include a timestamp that indicates a time at which the associated data entry was sampled by a corresponding sensor of the device that generated the pose metadata. Less delay between the capture of pose metadata, the rendering of spatial audio data, and the reproduction of the spatial audio data improves the accuracy of the reproduction of the spatial audio data. This is because the accurate reproduction of the spatial audio depends upon the accuracy of the pose used to render the spatial audio data with respect to the actual pose at the time of spatial audio reproduction. For example, in some embodiments, the accuracy of the reproduction of spatial audio data depends on the perceived location at which corresponding sound is reproduced with respect to the pose of the wearable device or user at the time of reproduction compared to the desired location at which the corresponding sound is intended to be reproduced with respect to the pose of the wearable device or user and/or with respect to a world space pose (e.g., cardinal directions or a real-world landmark).

To reduce latency and improve spatial audio reproduction accuracy, the pose estimate and spatial audio data are respectively updated and refined by the wearable device prior to spatial audio reproduction via speakers of the wearable device. For example, initial pose estimation and spatial audio data rendering may be performed at the companion device, which may be a smart phone or other mobile electronic device, based on pose metadata generated during a first time period by the wearable device that is indicative of the pose of the wearable device. The wearable device may receive an initial pose estimate and spatial audio data from the companion device then may update the initial pose estimate based on additional pose metadata generated during a second time period that follows the first time period. The wearable device may then refine the spatial audio data based on additional local sensor data and reproduce the refined spatial audio via speakers of the wearable device.

For example, a "dead-reckoning" algorithm may be used by the wearable device (or the companion device, in some embodiments) to update the initial pose estimate based on the additional pose metadata. In some embodiments, one or more Kalman filters are used to implement the dead-reckoning algorithm.

The spatial audio data may be refined by the wearable device based on the updated pose estimate by calculating a new local spatial audio transform based on a global spatial audio transform relative to the updated pose estimate. Equation 1 illustrates the relationship between a global spatial audio transform $T_{audio\text{-}source\text{-}global}$, which corresponds to the position and orientation of the emulated audio source as defined by an application executed at the wearable device and/or the companion device, a wearable device pose transform $T_{wearable\text{-}pose\text{-}global}$, which corresponds to the updated pose estimate of the wearable device, and a local spatial audio transform $T_{audio\text{-}source\text{-}local}$, which is the transform that is applied to the audio included in the spatial audio data when reproduced at the wearable device in order to emulate the audio as being output by an audio source at a particular spatial location.

$$T\text{audio-source-local}=T\text{wearable-pose-global}\hat{\ }-1*T\text{audio-source-global} \qquad \text{(EQ. 1)}$$

As shown, in Equation 1, The local spatial audio transform $T_{audio\text{-}source\text{-}local}$ to be applied to the audio data to emulate projection of the audio data from a source at a defined position and orientation is generated when refining the spatial audio data by multiplying the inverse of the wearable device pose transform $T_{wearable\text{-}pose\text{-}global}$ by the global spatial audio transform $T_{audio\text{-}source\text{-}global}$. The global spatial audio transform $T_{audio\text{-}source\text{-}global}$ may be included in or derived from audio pose metadata that is included in the spatial audio data. For example, when rendering the spatial audio data, the companion device may determine a location and orientation in world space at which an audio source is to be emulated during reproduction of the spatial audio data, and may store this location and orientation as audio pose metadata that is included in the spatial audio data. In some embodiments, the audio pose metadata may include a timestamp corresponding to the time at which the spatial audio data was rendered. The global spatial audio transform $T_{audio\text{-}source\text{-}global}$ and the wearable device pose transform $T_{wearable\text{-}pose\text{-}global}$ may each be expressed in a global coordinate reference frame (i.e., defined with respect to world space). By modifying the global spatial audio transform $T_{audio\text{-}source\text{-}global}$ with respect to the wearable device pose transform $T_{wearable\text{-}pose\text{-}global}$, the coordinate reference frame is changed from a global coordinate reference frame that is defined with respect to world space to a local coordinate reference frame that is defined with respect to the pose of the wearable device.

By utilizing pose metadata from the second time period to update the pose estimate and refining the spatial audio data based on the updated pose estimate, the perceived latency in the reproduced spatial audio (e.g., with respect to the location and rotation of the spatial audio) caused by differences between the actual pose of the wearable device at the time of spatial audio reproduction and the estimated pose of the wearable device used to render the spatial audio data is desirably reduced when compared to techniques in which pose estimation and spatial audio data rendering are performed exclusively at the companion device without subsequent modification.

FIG. 1 shows a system 100 for distributed data processing and, specifically, for the distributed processing of spatial audio data to be output via the speakers of a wearable device. The system 100 includes an audio rendering device 102 (also referred to as a "companion device 102") coupled to a head-worn device 104 (also referred to as a "wearable device 104") via a wired or wireless connection. One or both of the audio rendering device 102 and the wearable device 104 are communicatively coupled to a server 110 via wired and/or wireless connections and via a gateway or router 106 and/or a network 108. The network 108 may be a local area network (LAN) or a wide area network (WAN) such as the internet. In some embodiments, the audio rendering device 102 is communicatively connected to the wearable device 104 via a personal area network (PAN), wireless local area network (WLAN), and the like. As an example used below, the audio rendering device 102 is a mobile device such as a smartphone and the wearable device 104 is a pair of smartglasses. In some embodiments, the wearable device 104 and/or the audio rendering device 102 may be disposed within a room 112, having intrinsic acoustic properties that may be detected by the wearable device 104 or the audio rendering device 102 and used to create an acoustic room model. When mixed with spatial audio data, the acoustic room model modifies the spatial audio data to include non-idealities (e.g., echoing, reverberation, attenuation, and the like) that would be introduced to the corresponding sound if produced by an audio source disposed at a given location within the room 112, rather than at the wearable device 104.

In some embodiments, the audio rendering device 102 generates a pose estimate based on first pose metadata indicative of the pose of the wearable device 104 and renders corresponding spatial audio data, then sends the pose estimate and the spatial audio data to the wearable device 104. For example, the spatial audio data may include audio data that is to be reproduced by the wearable device 104 and may include audio pose metadata that defines the location and orientation (e.g., in world space) at which an audio source for the audio data is to be emulated during reproduction of the spatial audio data by the wearable device 104. The audio rendering device 102 may generate the audio pose metadata according to instructions received from an application being executed at the audio rendering device 102 and/or at the wearable device 104. The wearable device 104 then updates the pose estimate based on second pose metadata that was sampled after the first pose metadata, then refines the spatial audio data based on the updated pose estimate. For example, the wearable device 104 may refine the spatial audio data by calculating a new local spatial audio transform, as described previously in connection with Equation 1. By updating the pose estimate and refining the spatial audio data at the wearable device 104, latency between the pose estimation and spatial audio data reproduction at the wearable device 104 is reduced.

Figure 2:
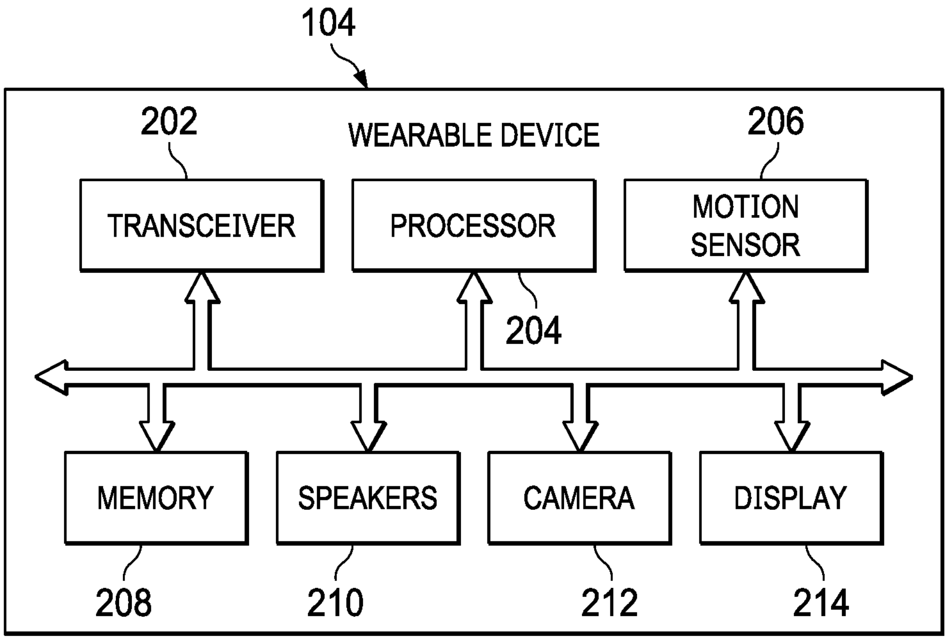
FIG. 2 is a block diagram of the wearable device of FIG. 1, in accordance with some embodiments.

FIG. 2 shows an illustrative block diagram of the wearable device 104, according to some embodiments. In the example of FIG. 2, the wearable device 104 includes a transceiver 202, a processor 204, a motion sensor 206, a memory 208, speakers 210, a camera 212, and a display 214, some or all of which may be communicatively connected via a communications bus. In some embodiments, the motion sensor 206 is an inertial measurement unit (IMU), and so is sometimes referred to herein as "IMU 206". The motion sensor 206 generates pose metadata, which may include motion data or acceleration data corresponding to detected movement of the wearable device 104 and corresponding timestamps and/or time synchronization data between the wearable device 104 and the companion device 102 or the server 110 (depending on the embodiment). In some embodiments, the motion sensor 206 can detect movement of the wearable device 104 in three or six degrees of freedom. In some embodiments, the processor 204 generates pose metadata based on the motion data or acceleration data generated by the motion sensor 206. In some embodiments, the camera 212 generates image data corresponding to the face of a wearer of the wearable device 104 or the environment in one or more directions around the wearer. Image data generated by the camera 212 can be included in the pose metadata or is used by the processor 204 to derive at least a portion of the pose metadata.

The transceiver 202 may include one or more transceiver circuits, each being configured to communicate according to a respective protocol such as a wireless LAN protocol (e.g., Wi-Fi), PAN protocol (e.g., Bluetooth, Zigbee), or cellular communication protocol (e.g., 4G, 4G LTE, 5G). The transceiver 202 transmits the pose metadata to the companion device 102 or the server 110, directly or via one or more intervening network devices, for pose estimate generation and spatial audio rendering. The transceiver 202 subsequently receives a pose estimate and spatial audio data from the companion device 102 or the server 110. In some embodiments, the motion sensor 206 and/or the processor 104 generate additional ("second") pose metadata during a time period that spans the time that the transceiver 202 outputs the initial ("first") pose metadata to the time that the transceiver 202 receives the pose estimate and spatial audio data and store the second pose metadata in the memory 208, such that second pose metadata is indicative of motion of the wearable device 104 during that time period. The processor 204 updates the pose estimate and refines the spatial audio data based on the second pose metadata. When refining the spatial audio data, the processor 204 can change the Left-Right speaker strengths (e.g., the respective volumes at which sound is produced by a left speaker and a right speaker of the speakers 210 of the wearable device 104, which the processor 204 may modify via control of the amplitude of audio signals provided to the left speaker and the right speaker or control of gain applied thereto) of the spatial audio data based on the change in pose of the wearable device 104 during the time period to which the second pose metadata corresponds, but for binaural audio a more complex algorithm may be required to correctly modify the sound considering all 6 Degrees of freedom of movement of the user. For example, the wearable device 104 may refine the spatial audio data by calculating a new local spatial audio transform, as described previously in connection with Equation 1. By refining the spatial audio data based on the updated pose estimate generated based on the second pose metadata, the spatial audio data to be reproduced via the speakers 210 is refined to account for motion of the wearable device 104 that occurred while the pose estimate and spatial audio data were being generated by the companion device 102 and/or the server 110, thereby reducing latency in the spatial audio data and improving the accuracy of spatial audio reproduction.

In some embodiments, the processor 204 mixes the spatial audio data with ambient or environmental audio properties, which the processor can generate according to an acoustic room model. The acoustic room model emulates acoustic properties of a room, such as the room 112, in which the wearable device 104 and/or the companion device 102 are disposed. For example, the processor 204 may generate the acoustic room model based on image data captured by the camera 212. In some embodiments, the acoustic room model is instead generated by the companion device 102 or the server 110 based on the image data captured by the camera 212 and is then provided to the wearable device 104 to be mixed with the spatial audio data. In some embodiments, the acoustic room model may be retrieved from a local or remote database of pre-generated room or environment models included in or communicatively coupled to the companion device 102 or the server 110.

Once the processor 204 updates the pose estimate and refines the spatial audio data, the processor 204 causes the speakers 210, which are configured for spatial sound reproduction, to output corresponding sound. The speakers 210 emulate the sound of the spatial audio data to be perceived as originating from a specific spatial location with respect to the estimated pose of the wearable device 104, as defined in the spatial audio data.

Returning to FIG. 1, in some embodiments, the wearable device 104 sends pose metadata generated to the audio rendering device 102 in response to a determination by an application being executed at the wearable device 104 or at the audio rendering device 102 that spatial audio data should be rendered and reproduced. In some embodiments, the wearable device 104 sends instructions to the audio rendering device 102 that indicate which audio data should be rendered. In some embodiments, the audio rendering device 102 renders the spatial audio in conjunction with AR/VR visual content to be transmitted to, and displayed at, the wearable device 104.

Upon receiving the pose metadata from the wearable device 104, the audio rendering device 102 estimates a pose (that is, position and/or orientation) of the wearable device 104 and renders spatial audio data based on the estimated pose and transmits the rendered spatial audio data to the wearable device. The audio rendering device 102 can render positional sound in several ways from simple panning (left-right channel strength) to binaural audio, for example.

In some embodiments, the audio data that is rendered as spatial audio data by the audio rendering device 102 is stored on a local memory device of the audio rendering device 102, while in other embodiments the audio rendering device 102 receives (e.g., streams) the audio data from the server 110. In some embodiments, the audio rendering device 102 passes the pose metadata from the wearable device 104 to the server 110, and the server 110 renders the spatial audio data and generates an initial pose estimate, then sends the initial pose estimate and spatial audio data to the wearable device 104 via the audio rendering device 102. In some embodiments, the wearable device 104 sends the pose metadata to the server 110 via the gateway or router 106 and/or via the network 108 directly, without the intervening audio rendering device 102, and the server 110 renders the spatial audio data, generates the initial pose estimate, and sends both to the wearable device 104 via the gateway or router 106 and/or the network 108.

In any of the above embodiments, latency from pose detection and corresponding pose metadata generation used to render the spatial audio data to spatial audio reproduction by speakers of the wearable device 104 can cause inaccurate audio data to be reproduced at an inaccurate spatial location, but this inaccuracy can be reduced by refining the spatial audio data and the pose estimate at the wearable device 104 using additional pose metadata generated after the wearable device 104 sent the initial pose metadata to the audio rendering device 102 or the server 110. As a result of this improvement in spatial audio reproduction accuracy, the latency perceived by the user upon spatial audio reproduction is advantageously reduced. For example, as the user may turn their head or otherwise change the pose of the wearable device 104 after the wearable device 104 sends the initial pose metadata to the audio rendering device 102 or to the server 110 and before the spatial audio is output by the wearable device 104, the estimated pose of the wearable device 104, as represented in the spatial audio, may be incorrectly aligned with the actual pose of the wearable device 104 at the time of spatial audio reproduction. Accordingly, in various embodiments, the system 100 provides for improved spatial audio reproduction in head-wearable devices through the use of pose estimation logic by the wearable device 104 to refine the pose estimate and spatial audio data generated by the companion device 102 or the server 110. For example, while feature extraction typically is performed on the companion device 102 based on image data captured by the camera 212 of the wearable device 104, the wearable device 104 can use motion or acceleration data generated by the IMU 206 to perform "dead reckoning" locally in order to generate a more accurate pose estimate, as described above.

Figure 3:
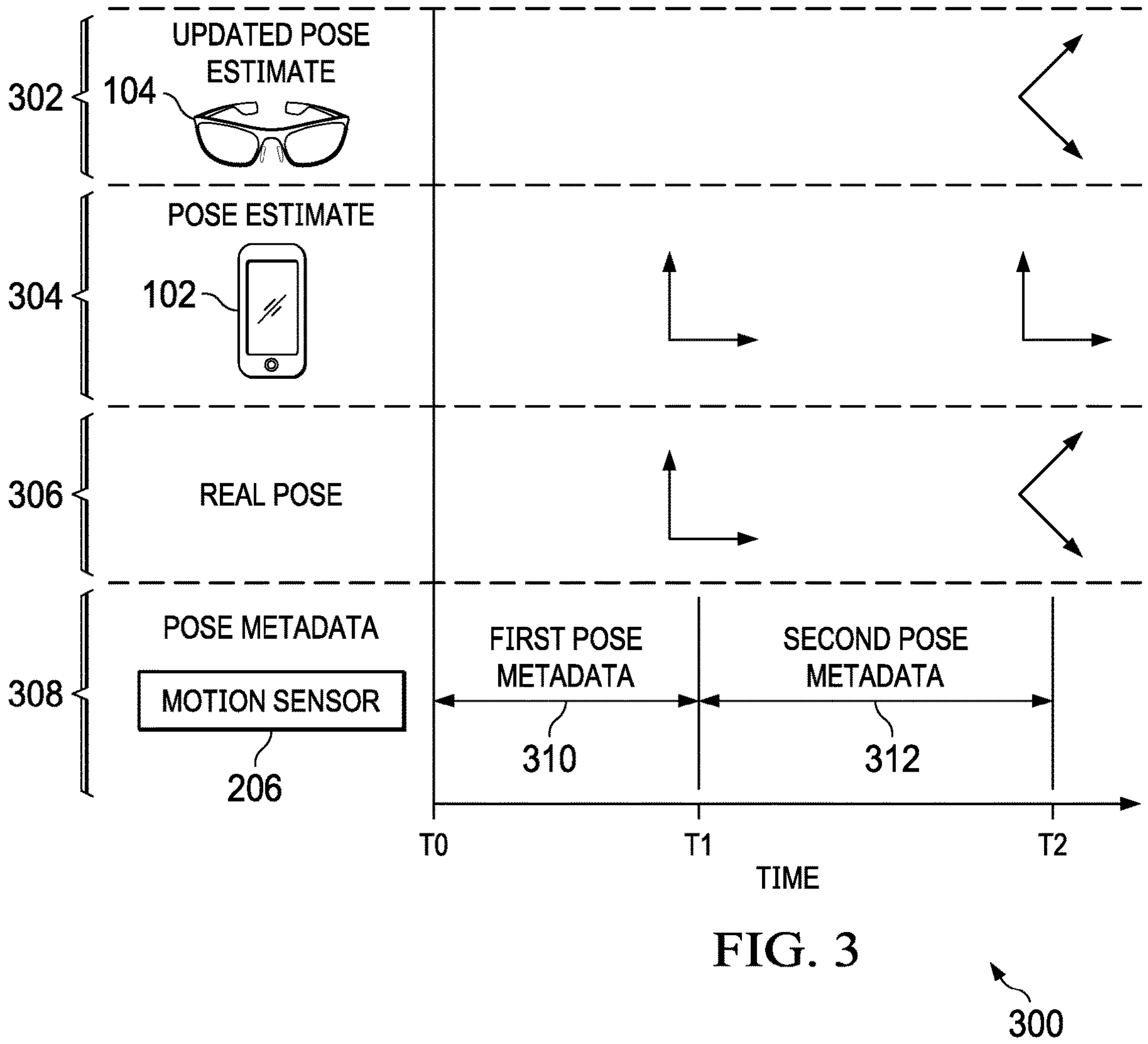
FIG. 3 is a chart depicting a change in pose estimation over time as real head pose changes and corresponding pose metadata is generated, in accordance with some embodiments.

To illustrate, FIG. 3 shows chart 300 depicting how, in some embodiments, the wearable device 104 avoids pose estimate inaccuracies introduced by the latency between the time the wearable device 104 transmits the first pose metadata to the companion device 102 and the time that the pose estimate is provided from the companion device 102 to the wearable device 104 by updating the pose estimate based on second pose metadata acquired after the first pose metadata is sent to the companion device 102. It should be understood that the example of FIG. 3 is also applicable to embodiments in which the initial pose estimate is generated by the server 110, rather than the companion device 102.

As shown, the chart 300 includes multiple rows 302, 304, 306, and 308. Row 308 shows pose metadata that the motion sensor 206 of the wearable device 104 generates over time. Row 306 shows the real pose of the wearable device 104 at discrete times T1 and T2. Row 304 shows the pose estimate generated by the companion device 102 at time T1 based on the first pose metadata 310. Row 302 shows the updated pose estimate generated by the wearable device 104 based on the pose estimate generated by the companion device 102 and further based on the second pose metadata 312.

In the present example, the motion sensor 206 of the wearable device 104 generates first pose metadata 310 during a time period from time T0 to time T1 (the "first time period"). It should be understood that the first pose metadata includes at least two samples of motion, acceleration, or image data obtained during the first time period, and is not merely reflective of a set of initial conditions. At time T1, the wearable device 104 transmits the first pose metadata 310 to the companion device 102, and the companion device 102 subsequently generates a pose estimate based on the first pose metadata 310. As shown in rows 304 and 306, the real pose at time T1 matches the pose estimate generated by the companion device 102. It should be noted that there may be some marginal delay between the transmission of first pose metadata 310 to the companion device 102 and the generation of the pose estimate by the companion device 102 to account for processing time.

Upon transmitting the first pose metadata 310 to the companion device 102, the wearable device 104 continues to generate pose metadata, specifically the second pose metadata 312, with the motion sensor 206 from time T1 to time T2. The period between time T1 and time T2 (the "second time period") corresponds to the time elapsed from the wearable device 104 sending the first pose metadata 310 to the companion device 102 and the companion device 102 sending the pose estimate and corresponding spatial audio data to the wearable device 104. From time T1 to time T2 in this example, the pose of the wearable device 104 changes (e.g., due to the wearer turning or moving their head) by about 45 degrees. This change in pose is not indicated in the first pose metadata 310 or the corresponding pose estimate generated by the companion device 102. After receiving the pose estimate from the companion device 102 at time T2, the wearable device 104 generates an updated pose estimate based on the second pose metadata 312, which takes into account the change in the real pose of the wearable device 104 that occurred from time T1 to time T2. The wearable device 104 then refines the spatial audio data based on the updated pose estimate, shown in row 302 to match the real pose shown in row 306 at or around time T2. In some embodiments, the wearable device 104 updates the pose estimate by integrating the second pose metadata over the second time period to determine the net change in pose during the second time period, and then adding the net change in pose to the initial pose estimate produced by the companion device 102. In this way, the accuracy with which spatial audio is reproduced, specifically with respect to the spatial location at which the audio is to be emulated, is improved compared to scenarios in which only the initial pose estimate and the first metadata 310 are used to render the spatial audio data.

Figure 4:
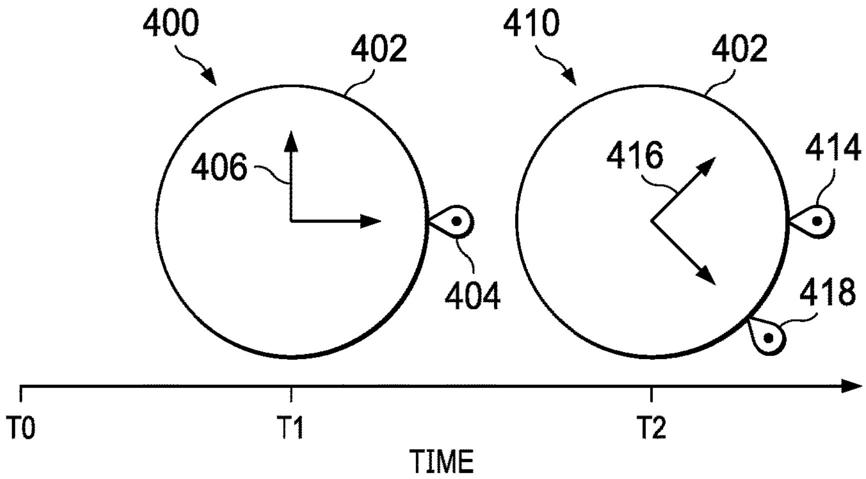
FIG. 4 is a diagram depicting differences between emulated spatial locations for sound reproduction with and without local refinement of corresponding spatial audio data and pose estimate, in accordance with some embodiments.

FIG. 4 illustrates the effect of latency on perceived sound position. Two top-down views 400 and 410 illustrate a situation in which a user wearing the wearable device 104 turns their head to the right between the time the first pose metadata was generated, at time T1, and the time that the wearable device 104 receives a first pose estimate and spatial audio data from the companion device 102 or the server 110, at time T2.

The view 400 shows the real pose 406 of the wearable device 104 at the end of a first time period, from time T0 to time T1, in which the motion sensor 206 of the wearable device 104 generates first pose metadata (e.g., first pose metadata 310 of FIG. 3). The marker 404 shows the location along a perimeter 402 at which the initial spatial audio data rendered by the companion device 102 or the server 110 will be emulated via the speakers 210 of the wearable device 104 upon reproduction, with respect to the pose of the wearable device 104.

The view 400 shows the real pose 416 of the wearable device 416 at the end of a second time period. from time T1 to time T2, in which the motion sensor 206 of the wearable device 104 generates second pose metadata (e.g., second pose metadata 312 of FIG. 3). The second time period generally spans the time it takes for the companion device 102 or the server 110 to generate the first pose estimate and render the spatial audio data. The real pose 416 is rotated with respect to the real pose 406, indicating that the user turned their head or body during the second time period. If the spatial audio data were left unchanged, the audio reproduced by the wearable device 104 based on the spatial audio data would be emulated to the right of the user, at the location of the marker 418, because the spatial location for emulating the spatial audio data is defined with respect to the pose of the wearable device 104 and would shift as the pose shifts. This would undesirably provide the user with the perception that the source of the audio is “floating” or “swimming”, without a fixed spatial position. In some instances, this effect is perceived by the user as though the audio source is moving with the user or is following the user’s movements with some delay, rather than being at a fixed spatial projection. In contrast, by updating the pose estimate provided by the companion device 102 or the server 110 based on the second pose metadata, then refining the spatial audio data based on the updated pose estimate, the wearable device 104 reproduces the spatial audio data at the correct spatial location, indicated by the marker 414, which corresponds to the location of the marker 404 in the view 400. By refining the spatial audio data in this way, the reproduced audio provides the user with the perception that the source of the audio is at a fixed spatial location that does not change as the user’s head or body moves.

Figure 5:
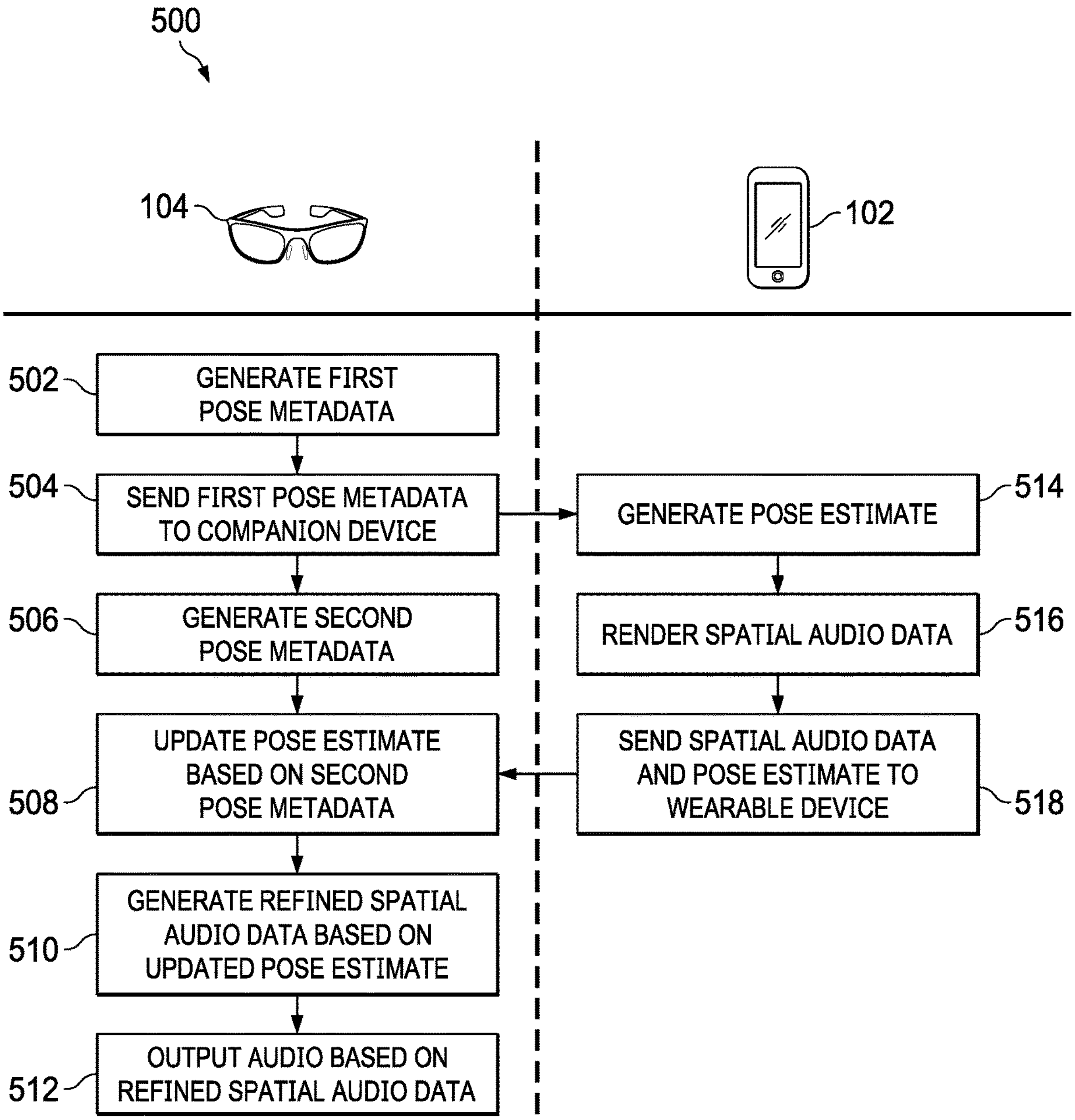
FIG. 5 is a flow diagram of a method of pose estimation and spatial audio refinement at a wearable device following initial pose estimation and spatial audio rendering at a companion device, in accordance with some embodiments.

FIG. 5 shows an illustrative process flow for a method 500 of rendering and reproducing spatial audio data. In the method 500, a pose estimate of a wearable device and spatial audio data generated at a companion device based on first pose metadata are updated by the wearable device based on second pose metadata that is generated while the companion device is generating the pose estimate and the spatial audio data. In the present example, the method 500 is performed by the wearable device 104 and the companion device 102 of FIG. 1. However, in some embodiments, other applicable devices such as the server 110 can perform some or all of the functions attributed to the companion device 102 in the present example. Functions of the wearable device 104 are sometimes described with respect to the diagram of FIG. 2 in the present example.

At block 502, the wearable device 104 generates first pose metadata. In some embodiments, the first pose metadata includes motion data or acceleration data generated by the motion sensor 206 of the wearable device 104, which may be an IMU. In some embodiments, the wearable device 104 may generate the first pose metadata based on image data captured by the camera 212 of the wearable device 104 in addition to or instead of the motion data or acceleration data generated by the motion sensor 206. The wearable device 104 samples the first pose metadata during a first time period that ends immediately prior to the time at which the wearable device 104 sends the first pose metadata to the companion device 102.

At block 504, the wearable device 104 sends the first pose metadata to the companion device 102. For example, the wearable device 104 may wirelessly transmit the first pose metadata to the companion device 102 using the transceiver 202.

At block 514, the companion device 102 generates a pose estimate based on the first pose metadata received from the wearable device 104. For example, the companion device 102 may analyze motion data, acceleration data, and/or image data included in the first pose metadata to determine, with three or six degrees of freedom, how the pose of the wearable device 104 changed with respect to an initial pose during the first time period in which the first pose metadata was sampled.

At block 516, the companion device 102 renders spatial audio data based on the pose estimate. In some embodiments, the companion device 102 retrieves audio data based on instructions received from the wearable device 104, which may be generated by a software application being executed by the wearable device 104. For example, the software application may be a navigation application, a VR application, an AR application, or the like. For example, the software application may be an AR or VR safety system that warns a user of potential collisions with walls, objects, or people by playing a sound from the direction and position of the detected danger (i.e., potential collision). As another example, the software application may be a real-time audio translation app that plays back the synthetic translated voice from the pose of a real person who is talking to the user who is wearing the wearable. As another example, the software application may be configured to cause sound to appear to be emitted from a physical device such as a TV, monitor, tablet, phone, or the like, without actually causing sound to be emitted from speakers of the physical device, but instead virtually playing the sound at the speakers of the wearable device. As another example, the software application may be configured to emit a virtual sound emulated from the location of an IoT device, such as an appliance, smart lightbulb, or the like, responsive to changes in state of the IoT device or responsive to the user moving within a defined proximity of the IoT device.

The companion device 102 can retrieve the audio data from a local memory of the companion device 102 or from a remote memory such as that of the server 110. After obtaining the audio data, the companion device 102 spatializes the audio data based on the pose estimate to render to the spatial audio data. For example, the companion device 102 may determine a spatial location at which the audio data is to be emulated based on the instructions received from the wearable device 104 and based on the pose estimate. In some embodiments, the companion device 102 may use a head-related transfer function (HRFT) model to render the spatial audio data for emulated reproduction at a particular spatial location based on the pose estimate.

At block 518, the companion device 102 sends the spatial audio data and the pose estimate to the wearable device 104.

At block 506, concurrently with blocks 514, 516, and 518, the wearable device 104 generates second pose metadata that includes motion data or acceleration data generated by the motion sensor 206 and/or image data generated by the camera 212. The second pose metadata is sampled over a second time period that immediately follows the first time period. In some embodiments, the second time period begins at the time the wearable device 104 sends the first pose metadata to the companion device 102 and ends at the time the wearable device 104 receives the spatial audio data and the pose estimate from the companion device 102.

At block 508, after block 506 and block 518, the wearable device 104 generates an updated pose estimate based on the second pose metadata. For example, the wearable device 104 may analyze motion data, acceleration data, and/or image data included in the second pose metadata to determine, with three or six degrees of freedom, how the pose of the wearable device 104 changed during the second time period in which the second pose metadata was sampled. The wearable device 104 may then update the pose estimate based on how the pose changed during the second time period to produce the updated pose estimate.

At block 510, the wearable device 104 generates refined spatial audio data based on the spatial audio data received from the companion device 102 and based on one or both of the pose estimate received from the companion device 102 and the updated pose estimate. In some embodiments, the wearable device 104 refines the spatial audio data by adjusting the spatial location at which audio projection is to be emulated (e.g., with respect to the pose of the wearable device, the pose of the user, and/or the pose in world space) based on the updated pose estimate. In some embodiments, the wearable device 104 refines the spatial audio data by adjusting the spatial location based on a difference between the pose estimate and the updated pose estimate. In some embodiments, the wearable device 104 refines the spatial audio data based on the updated pose estimate and audio pose metadata with respect to a world space pose (e.g., cardinal directions or a real-world landmark), as described previously in connection with Equation 1.

At block 512, the wearable device 104 outputs audio via the speakers 110 based on the refined spatial audio data. In some embodiments, the wearable device 104 may delay the output of the audio until the user is in a particular predefined orientation. In some embodiments, the wearable device 104 may delay the output of the audio until the pose remains substantially unchanged for longer than a predefined amount of time. In some embodiments, the wearable device 104 may attenuate the audio output by the speakers 110 (e.g., by reducing the volume of the audio to zero over a predefined time period) in response to determining that the pose of the user has changed by more than a predetermined threshold amount during audio playback to provide feedback to the user that the spatial audio being output by the wearable device 104 may no longer be applicable to the user's current pose.

Figure 6:
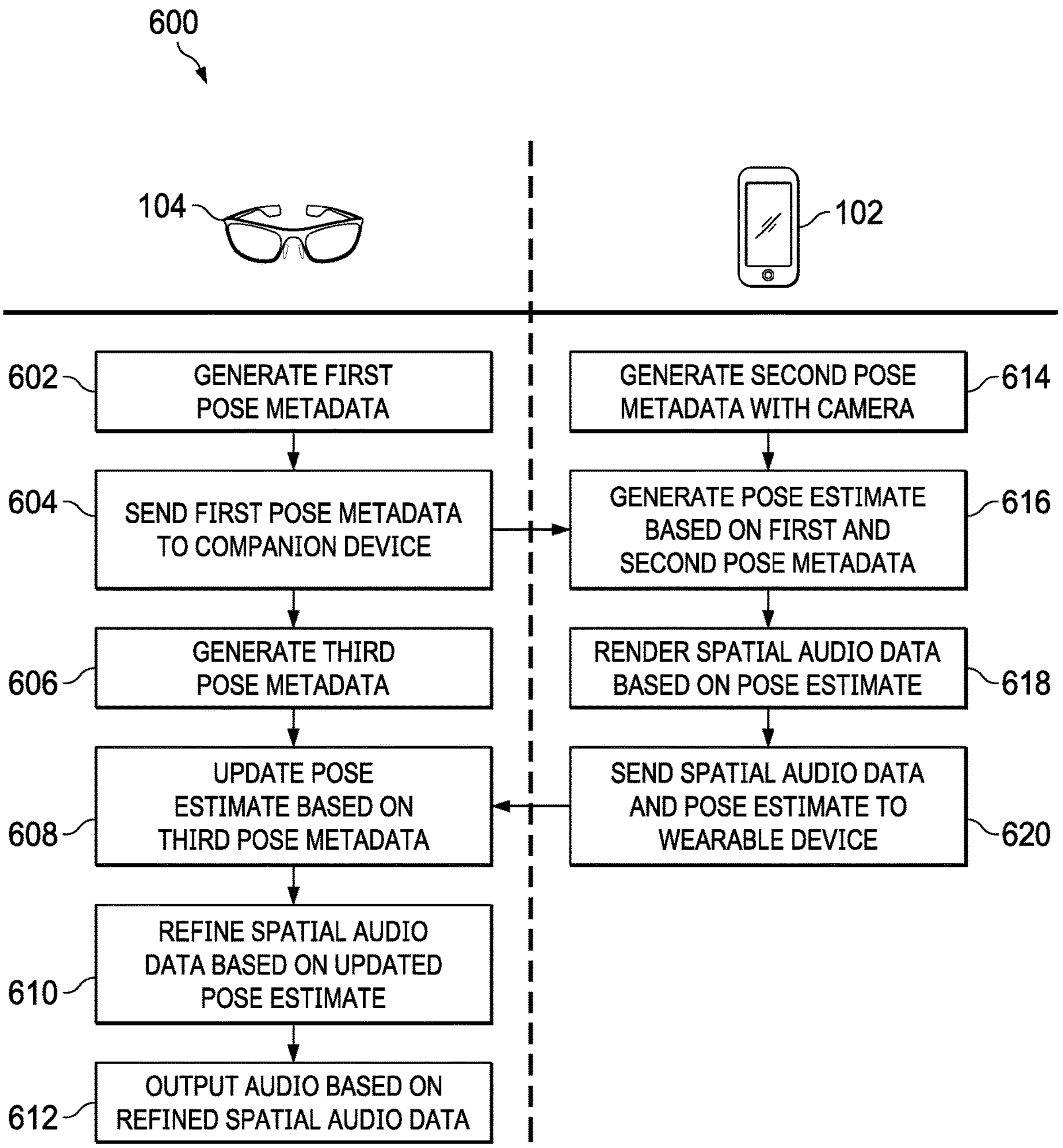
FIG. 6 is a flow diagram of a method of pose estimation and spatial audio refinement at a wearable device following initial pose estimation and spatial audio rendering at a companion device, where the initial pose estimate is based in part on pose metadata captured with a camera and/or other sensors of the companion device, in accordance with some embodiments.

FIG. 6 shows an illustrative process flow for a method 600 of rendering and reproducing spatial audio data. In the method 600, a pose estimate of a wearable device and spatial audio data generated at a companion device based on first pose metadata generated by a motion sensor of the wearable device and based on second pose metadata generated by a camera of the companion device are updated by the wearable device based on third pose metadata that is generated while the companion device is generating the pose estimate and the spatial audio data. In the present example, the method 600 is performed by the wearable device 104 and the companion device 102 of FIG. 1. However, in some embodiments, other applicable devices such as the server 110 can perform at least some of the functions attributed to the companion device 102 in the present example. Functions of the wearable device 104 are sometimes described with respect to the diagram of FIG. 2 in the present example.

At block 602, the wearable device 104 generates first pose metadata. In some embodiments, the first pose metadata includes motion data or acceleration data generated by the motion sensor 206 of the wearable device 104, which may be an IMU. In some embodiments, the wearable device 104 may generate the first pose metadata based on image data captured by the camera 212 of the wearable device 104 in addition to or instead of the motion data or acceleration data generated by the motion sensor 206. The wearable device 104 samples the first pose metadata during a first time period that ends immediately prior to the time at which the wearable device 104 sends the first pose metadata to the companion device 102.

At block 614, concurrently with block 602, the companion device 102 generates second pose metadata using a camera of the companion device 102. For example, the second pose metadata may include image data captured by the camera, where the image data includes images from the wearable device 104. The companion device 102 samples the image data corresponding to the second pose metadata over the first time period. In some embodiments, one or more other sensors may be used instead of or in addition to the camera of the companion device 102 to generate the second pose metadata. For example, such sensors may include ultra-wideband chip sensors, infrared LED sensors, tracking marker sensors, and/or a three-dimensional spatial laser tracking system.

At block 604, the wearable device 104 sends the first pose metadata to the companion device 102. For example, the wearable device 104 may wirelessly transmit the first pose metadata to the companion device 102 using the transceiver 202.

At block 616, after blocks 604 and 614, the companion device 102 generates a pose estimate based on the first pose metadata received from the wearable device 104 and the second pose metadata. For example, the companion device 102 may analyze the motion data, acceleration data, and/or image data included in the first pose metadata and the image data included in the second pose metadata to determine, with three or six degrees of freedom, how the pose of the wearable device 104 changed with respect to an initial pose during the first time period in which the first pose metadata and the second pose metadata were sampled.

At block 618, the companion device 102 renders spatial audio data based on the pose estimate. In some embodiments, the companion device 102 retrieves audio data based on instructions received from the wearable device 104, which may be generated by a software application being executed by the wearable device 104. The companion device 102 can retrieve the audio data from a local memory of the companion device 102 or from a remote memory such as that of the server 110. After obtaining the audio data, the companion device 102 spatializes the audio data based on the pose estimate to render to the spatial audio data. For example, the companion device 102 may determine a spatial location at which the audio data is to be emulated based on the instructions received from the wearable device 104 and based on the pose estimate. In some embodiments, the companion device 102 may use an HRFT model to render the spatial audio data for emulated reproduction at a particular spatial location based on the pose estimate.

At block 620, the companion device 102 sends the spatial audio data and the pose estimate to the wearable device 104.

At block 606, concurrently with blocks 616, 618, and 620, the wearable device 104 generates third pose metadata that includes motion data or acceleration data generated by the motion sensor 206 and/or image data generated by the camera 212. The third pose metadata is sampled over a second time period that immediately follows the first time period. In some embodiments, the second time period begins at the time the wearable device 104 sends the first pose metadata to the companion device 102 and ends at the time the wearable device 104 receives the spatial audio data and the pose estimate from the companion device 102.

At block 608, after blocks 606 and 620, the wearable device 104 generates an updated pose estimate based on the third pose metadata. For example, the wearable device 104 may analyze motion data, acceleration data, and/or image data included in the third pose metadata to determine, with three or six degrees of freedom, how the pose of the wearable device 104 changed during the second time period in which the third pose metadata was sampled. The wearable device 104 may then update the pose estimate based on how the pose changed during the second time period to produce the updated pose estimate.

At block 610, the wearable device 104 generates refined spatial audio data based on the spatial audio data received from the companion device 102 and one or both of the pose estimate received from the companion device 102 and the updated pose estimate. In some embodiments, the wearable device 104 refines the spatial audio data by adjusting the spatial location at which audio projection is to be emulated based on the updated pose estimate. In some embodiments, the wearable device 104 refines the spatial audio data by adjusting the spatial location based on a difference between the pose estimate and the updated pose estimate. In some embodiments, the wearable device 104 refines the spatial audio data based on the updated pose estimate and audio pose metadata with respect to a world space pose (e.g., cardinal directions or a real-world landmark), as described previously in connection with Equation 1.

At block 612, the wearable device 104 outputs audio via the speakers 110 based on the refined spatial audio data. In some embodiments, the wearable device 104 may delay the output of the audio until the user is in a particular predefined orientation. In some embodiments, the wearable device 104 may delay the output of the audio until the pose remains substantially unchanged for longer than a predefined amount of time. In some embodiments, the wearable device 104 may attenuate the audio output by the speakers 110 (e.g., by reducing the volume of the audio to zero over a predefined time period) in response to determining that the pose of the user has changed by more than a predetermined threshold amount during audio playback to provide feedback to the user that the spatial audio being output by the wearable device 104 may no longer be applicable to the user's current pose.

Figure 7:
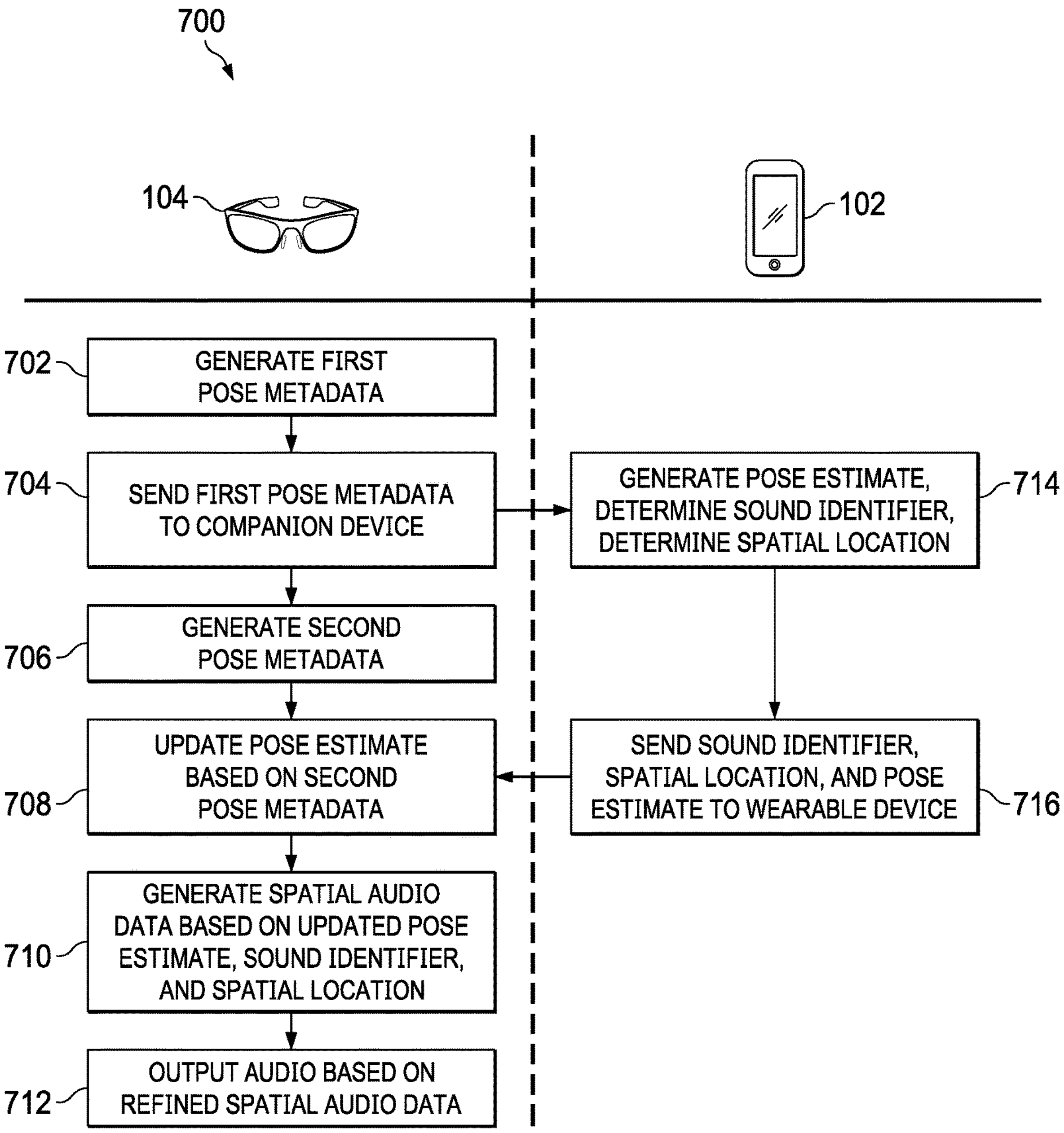
FIG. 7 is a flow diagram of a method of pose estimation and spatial audio refinement at a wearable device following initial pose estimation and spatial location determination at a companion device, using audio data pre-stored on the wearable device, in accordance with some embodiments.

FIG. 7 shows an illustrative process flow for a method 700 of rendering and reproducing spatial audio data. In the method 700, a pose estimate of a wearable device generated at a companion device based on first pose metadata generated by a motion sensor of the wearable device is updated by the wearable device based on second pose metadata that is generated while the companion device is generating the pose estimate. Rather than rendering the spatial audio data with the companion device, the wearable device stores preloaded sounds that are identified by the companion device for reproduction. In some embodiments, the preloaded sounds are provided to the wearable device by the companion device prior to execution of the method 700. By using preloaded audio at the local wearable device, rather than rendering audio data at a remote device, latency is advantageously reduced.

In the present example, the method 700 is performed by the wearable device 104 and the companion device 102 of FIG. 1. However, in some embodiments, other applicable devices such as the server 110 can perform at least some of the functions attributed to the companion device 102 in the present example. Functions of the wearable device 104 are sometimes described with respect to the diagram of FIG. 2 in the present example.

At block 702, the wearable device 104 generates first pose metadata. In some embodiments, the first pose metadata includes motion data or acceleration data generated by the motion sensor 206 of the wearable device 104, which may be an IMU. In some embodiments, the wearable device 104 may generate the first pose metadata based on image data captured by the camera 212 of the wearable device 104 in addition to or instead of the motion data or acceleration data generated by the motion sensor 206. The wearable device 104 samples the first pose metadata during a first time period that ends immediately prior to the time at which the wearable device 104 sends the first pose metadata to the companion device 102.

At block 704, the wearable device 104 sends the first pose metadata to the companion device 102. For example, the wearable device 104 may wirelessly transmit the first pose metadata to the companion device 102 using the transceiver 202.

At block 714, the companion device 102 generates a pose estimate based on the first pose metadata received from the wearable device 104, determines a sound identifier that identifies a sound to be reproduced at the wearable device 104, and determines a spatial location at which reproduced sound is to be emulated. For example, the companion device 102 may analyze motion data, acceleration data, and/or image data included in the first pose metadata to determine, with three or six degrees of freedom, how the pose of the wearable device 104 changed with respect to an initial pose during the first time period in which the first pose metadata was sampled.

Various pre-loaded sounds may be stored at the memory 208 of the wearable device 104. Based on instructions received from the wearable device 104 or originating at the companion device 102, which may be generated by a software application being executed by the wearable device 104 or by the companion device 102, respectively, the companion device 102 determines which of the pre-loaded sounds should be output by the wearable device 104 and selects a corresponding sound identifier.

The instructions generated by the software application may also indicate a pose-dependent location at which the pre-loaded sound should be reproduced by the wearable device 104. Upon generating the pose estimate, the companion device 102 determines a spatial location based on the pose-dependent location indicated in the instructions and based on the pose estimate.

At block 716, the companion device 102 sends the pose estimate, the sound identifier, and the spatial location to the wearable device 104.

At block 706, concurrently with blocks 714 and 716, the wearable device 104 generates second pose metadata that includes motion data or acceleration data generated by the motion sensor 206 and/or image data generated by the camera 212. The second pose metadata is sampled over a second time period that immediately follows the first time period. In some embodiments, the second time period begins at the time the wearable device 104 sends the first pose metadata to the companion device 102 and ends at the time the wearable device 104 receives the spatial audio data and the pose estimate from the companion device 102.

At block 708, after blocks 706 and 716, the wearable device 104 generates an updated pose estimate based on the second pose metadata. For example, the wearable device 104 may analyze motion data, acceleration data, and/or image data included in the second pose metadata to determine, with three or six degrees of freedom, how the pose of the wearable device 104 changed during the second time period in which the second pose metadata was sampled. The wearable device 104 may then update the pose estimate based on how the pose changed during the second time period to produce the updated pose estimate.

At block 710, the wearable device 104 generates spatial audio data based on the sound identifier and spatial location received from the companion device 102 and based on the updated pose estimate. For example, the wearable device 104 may retrieve audio data from the memory 208 based on the sound identifier. The wearable device 104 may then spatialize the retrieved audio data based on the spatial location and the updated pose estimate (e.g., using a binaural rendering technique) to generate the spatial audio data.

At block 712, the wearable device 104 outputs audio via the speakers 110 based on the spatial audio data. In some embodiments, the wearable device 104 may delay the output of the audio until the user is in a particular predefined orientation or until another predefined condition is met. In some embodiments, the wearable device 104 may delay the output of the audio until the pose remains substantially unchanged for longer than a predefined amount of time. In some embodiments, the wearable device 104 may attenuate the audio output by the speakers 110 (e.g., by reducing the volume of the audio to zero over a predefined time period) in response to determining that the pose of the user has changed by more than a predetermined threshold amount during audio playback to provide feedback to the user that the spatial audio being output by the wearable device 104 may no longer be applicable to the user's current pose.

Figure 8:
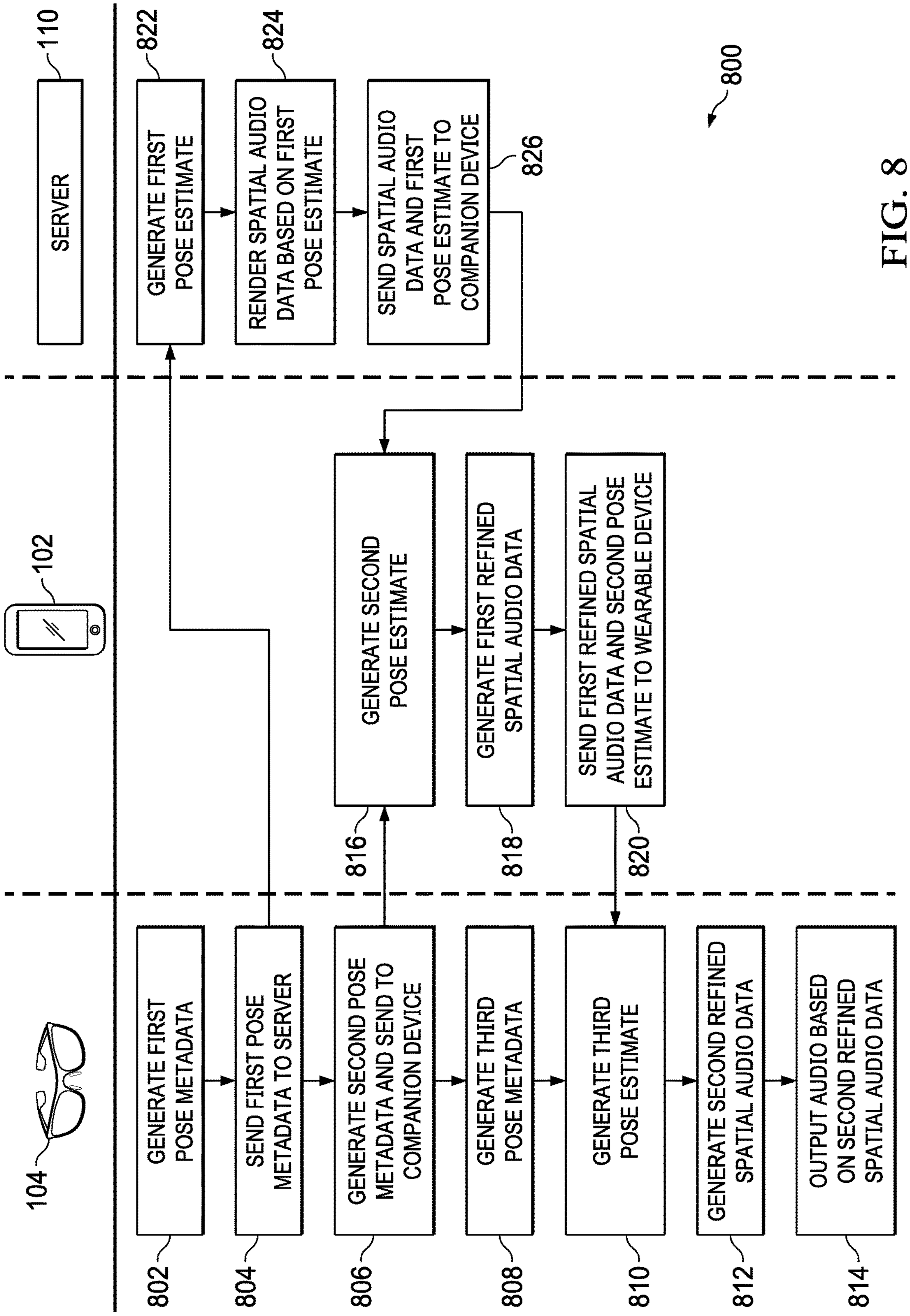
FIG. 8 is a flow diagram of a method of multi-stage pose estimation and spatial audio refinement at a wearable device and a companion device following initial pose estimation and spatial audio rendering at a remote server, in accordance with some embodiments.

FIG. 8 shows an illustrative process flow for a method 800 of rendering and reproducing spatial audio data with multi-stage pose estimation and spatial audio refinement. In the present example, the method 800 is performed by the wearable device 104, the companion device 102, and the server 110 of FIG. 1. Functions of the wearable device 104 are sometimes described with respect to the diagram of FIG. 2 in the present example.

At block 802, the wearable device 104 generates first pose metadata. In some embodiments, the first pose metadata includes motion data or acceleration data generated by the motion sensor 206 of the wearable device 104, which may be an IMU. In some embodiments, the wearable device 104 may generate the first pose metadata based on image data captured by the camera 212 of the wearable device 104 in addition to or instead of the motion data or acceleration data generated by the motion sensor 206. The wearable device 104 samples the first pose metadata during a first time period that ends immediately prior to the time at which the wearable device 104 sends the first pose metadata to the server 110.

At block 804, the wearable device 104 sends the first pose metadata to the server 110. For example, the wearable device 104 may wirelessly transmit the first pose metadata to the companion device 102 using the transceiver 202, and the companion device 102 may then send the first pose metadata to the server 110 via the gateway or router 106, the network 108, a cellular network, or some combination of these. Alternatively, the wearable device 104 may send the first pose metadata to the server 110 using the transceiver 202 via the gateway or router 106, the network 108, a cellular network, or some combination of these without including the companion device 102 in the communication path.

At block 822, the server 110 generates a first pose estimate based on the first pose metadata received from the wearable device 104. For example, the server 110 may analyze motion data, acceleration data, and/or image data included in the first pose metadata to determine, with three or six degrees of freedom, how the pose of the wearable device 104 changed with respect to an initial pose during the period in which the first pose metadata was sampled.

At block 824, the server 110 renders spatial audio data based on the first pose estimate. In some embodiments, the server 110 retrieves audio data based on instructions received from the wearable device 104, which may be generated by a software application being executed by the wearable device 104. For example, the server 110 can retrieve the audio data from local memory. After obtaining the audio data, the server 110 spatializes the audio data based on the first pose estimate to render to the spatial audio data. For example, the server 110 may determine a spatial location at which the audio data is to be emulated based on the instructions received from the wearable device 104 and based on the first pose estimate. In some embodiments, the server 110 may use an HRFT model to render the spatial audio data for emulated reproduction at a particular spatial location based on the first pose estimate.

At block 826, the server 110 sends the spatial audio data and the first pose estimate to the companion device 102. According to various embodiments, the server 110 can send the spatial At block 806, concurrently with blocks 822, 824, and 826, the wearable device 104 generates second pose metadata that includes motion data or acceleration data generated by the motion sensor 206 and/or image data generated by the camera 212, where the second pose metadata is sampled during a second time period that immediately follows the first time period. In some embodiments, the second time period begins at the time the wearable device 104 sends the first pose metadata to the server 110 and ends at the time the companion device 102 receives the spatial audio data and the first pose estimate from the server 110.

At block 816, after blocks 806 and 826, the companion device 102 generates a second pose estimate based on the second pose metadata received from the wearable device 104. For example, the companion device 102 may analyze motion data, acceleration data, and/or image data included in the second pose metadata to determine, with three or six degrees of freedom, how the pose of the wearable device 104 changed during the second time period in which the second pose metadata was sampled. The wearable device 104 may then update the first pose estimate based on how the pose changed during the second time period to produce the second pose estimate.

At block 818, the companion device 102 generates first refined spatial audio data based on the spatial audio data received from the server 110 and one or both of the first pose estimate received from the server 110 and the second pose estimate. In some embodiments, the companion device 102 refines the spatial audio data by adjusting the spatial location at which audio projection is to be emulated based on the second pose estimate. In some embodiments, the companion device 102 refines the spatial audio data by adjusting the spatial location based on a difference between the first pose estimate and the second pose estimate. In some embodiments, the companion device 102 refines the spatial audio data based on the second pose estimate and audio pose metadata with respect to a world space pose (e.g., cardinal directions or a real-world landmark), as described previously in connection with Equation 1.

At block 820, the companion device 102 sends the first refined spatial audio data and the second pose estimate to the wearable device 104.

At block 808, concurrently with blocks 816, 818, and 820, the wearable device 104 generates third pose metadata that includes motion data or acceleration data generated by the motion sensor 206 and/or image data generated by the camera 212, where the third pose metadata is sampled during a third time period that immediately follows the second time period. In some embodiments, the third time period begins at the time the wearable device 104 sends the second pose metadata to the companion device 102 and ends at the time the wearable device 104 receives the first refined spatial audio data and the second pose estimate from the companion device 102.

At block 810, after blocks 808 and 820, the wearable device 104 generates a third pose estimate based on the third pose metadata. For example, the wearable device 104 may analyze motion data, acceleration data, and/or image data included in the third pose metadata to determine, with three or six degrees of freedom, how the pose of the wearable device 104 changed during the third time period in which the third pose metadata was sampled. The wearable device 104 may then update the second pose estimate based on how the pose changed during the third time period to produce the third pose estimate.

At block 812, the wearable device 104 generates second refined spatial audio data based on the first refined spatial audio data received from the companion device 102 and one or both of the second pose estimate received from the companion device 102 and the third pose estimate. In some embodiments, the wearable device 104 refines the first refined spatial audio data by adjusting the spatial location at which audio projection is to be emulated based on the third pose estimate. In some embodiments, the wearable device 104 refines the first refined spatial audio data by adjusting the spatial location based on a difference between the second pose estimate and the third pose estimate. In some embodiments, the wearable device 104 further refines the first refined spatial audio data based on the third pose estimate and audio pose metadata with respect to a world space pose (e.g., cardinal directions or a real-world landmark), as described previously in connection with Equation 1.

At block 814, the wearable device 104 outputs audio via the speakers 110 based on the second refined spatial audio data. In some embodiments, the wearable device 104 may delay the output of the audio until the user is in a particular predefined orientation. In some embodiments, the wearable device 104 may delay the output of the audio until the pose remains substantially unchanged for longer than a predefined amount of time. In some embodiments, the wearable device 104 may attenuate the audio output by the speakers 110 (e.g., by reducing the volume of the audio to zero over a predefined time period) in response to determining that the pose of the user has changed by more than a predetermined threshold amount during audio playback to provide feedback to the user that the spatial audio being output by the wearable device 104 may no longer be applicable to the user's current pose.

In some embodiments, the method 800 may be selectively performed by the wearable device 104, the companion device 102, and the server 110 based on a determined processing workload of the companion device 102 or the device 104. For example, the method 800 may be performed in response to the wearable device 104 or the companion device 102 determining that a processing workload of the companion device 102 exceeds a predetermined threshold (e.g., 80% of maximum processor utilization). In some such embodiments, if the processing workload is not exceeded, another spatial audio rendering method, such as one of the methods of FIGS. 5-7, may be performed instead. As another example, the method 800 may be performed in response to the wearable device 104 or the companion device 102 determining that the network latency between the wearable device 104 and the server 110 is less than the network latency between the wearable device 104 and the companion device 102. If the network latency between the wearable device 104 and the server 110 is higher, however, another spatial audio rendering method, such as one of the methods of FIGS. 5-7, may be performed instead.

In any of the examples of FIGS. 1-8, acoustic modelling may be applied to the refined spatial audio data to improve the realism of the sound in a mixed reality environment and to consider the correct physical acoustic properties of the room or environment of the user (reverberation, etc.). For example, the companion device 102 and the wearable device 104 may create acoustic model of the physical room in which the wearable device is disposed, including the location of walls and objects and the materials which are likely to impact sound quality. In some embodiments, this acoustic model can be generated at least in part based on 3D modeling of the environment obtained from imaging camera(s) on the companion device 102 and/or the wearable device 104. This acoustic room model then is then stored at one or both of the companion device 102 and the wearable device 104 for subsequent mixing with refined spatial audio data. In some embodiments, the acoustic model has a position and orientation that is calibrated to the real world and the wearable device 104 adjusts the acoustic model with respect to the final pose estimate immediately prior to audio playback.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

with a wearable device comprising a first processor, receiving, from a companion device separate from the wearable device and comprising a second processor, spatial audio data and a first pose estimate corresponding to the wearable device that are generated by the second processor of the companion device;

with the first processor of the wearable device, generating a second pose estimate corresponding to the wearable device based on updating the first pose estimate;

with the first processor of the wearable device, refining the spatial audio data based on the second pose estimate; and with the wearable device, producing sound based on the refined spatial audio data.

2. The method of claim 1, further comprising:

with a motion sensor of the wearable device, generating first pose metadata during a first time period, wherein the first pose estimate is generated based on the first pose metadata.

3. The method of claim 2, further comprising:

with the motion sensor, generating second pose metadata during a second time period, wherein the wearable device generates the second pose estimate based on the second pose metadata.

4. The method of claim 1, further comprising:

with a motion sensor of the wearable device, generating first pose metadata during a first time period; and with a camera of the companion device, generating second pose metadata during the first time period, wherein the companion device generates the first pose estimate based on the first pose metadata and the second pose metadata.

5. The method of claim 4, further comprising:

with the motion sensor, generating third pose metadata during a second time period, wherein the wearable device generates the second pose estimate based on the third pose metadata.

6. The method of claim 1, wherein refining the spatial audio data comprises calculating a local spatial audio transform having a local coordinate reference frame based on a global spatial audio transform having a global coordinate reference frame and the second pose estimate, wherein the global spatial audio transform is indicative of a location and orientation at which an audio source is to be emulated upon reproduction of the spatial audio data in world space.

7. A system comprising:

a wearable device comprising:

a processor configured to execute computer-readable instructions that, when executed, cause the processor to:

receive, from a companion device separate from the wearable device and comprising a second processor, spatial audio data that corresponds to a first pose estimate of the wearable device that is generated by the second processor;

generate refined spatial audio data by modifying the spatial audio data based on a second pose estimate of the wearable device; and produce sound based on the refined spatial audio data.

8. The system of claim 7, wherein the wearable device further comprises:

a motion sensor configured to generate first pose metadata during a first time period, wherein the first pose estimate is generated based on the first pose metadata.

9. The system of claim 8, wherein the motion sensor is further configured to generate second pose metadata during a second time period, wherein the processor generates the second pose estimate based on the second pose metadata.

10. The system of claim 9, wherein the second time period begins immediately after the first time period.

11. The system of claim 8, further comprising:

the companion device comprising a camera, wherein the companion device is configured to:

generate second pose metadata during the first time period, the second pose metadata comprising image data captured by the camera during the first time period; and generate the first pose estimate based on the first pose metadata and the second pose metadata.

12. The system of claim 11, wherein the motion sensor is further configured to generate third pose metadata during a second time period, wherein the processor generates the second pose estimate based on the third pose metadata.

13. A system comprising:

a first device comprising:

a first processor configured to execute computer-readable instructions that, when executed, cause the first processor to:

generate a first pose estimate; and render spatial audio data based on the first pose estimate; and a second device comprising:

a second processor configured to execute computer-readable instructions that, when executed, cause the second processor to:

generate first refined spatial audio data based on a second pose estimate, wherein the first pose estimate and the second pose estimate respectively correspond to at least one pose of the second device; and produce sound based on the first refined spatial audio data.

14. The system of claim 13, wherein the second device further comprises:

a motion sensor configured to generate first pose metadata during a first time period, wherein the first processor is configured to generate the first pose estimate based on the first pose metadata.

15. The system of claim 14, wherein the motion sensor is further configured to generate second pose metadata during a second time period, wherein the second processor is configured to generate the second pose estimate based on the second pose metadata.

16. The system of claim 15, further comprising:

a third device comprising:

a third processor configured to generate computer-readable instructions which, when executed, cause the third processor to:

generate second refined spatial audio data by refining the spatial audio data generated by the first processor based on a third pose estimate corresponding to the second device, wherein the first refined spatial audio data is generated by the second processor by refining the second refined spatial audio data.

17. The system of claim 16, wherein the motion sensor is further configured to generate third pose metadata during a third time period, wherein the third processor is configured to generate the third pose estimate based on the third pose metadata.

18. The system of claim 17, wherein the third time period occurs between the first time period and the second time period.

19. The system of claim 17, wherein the first device is a server, the second device is a wearable device, the third device is a mobile device, and the wearable device is communicatively coupled to the server and the mobile device.

20. A wearable device comprising:

speakers; and a processor configured to execute computer-readable instructions which, when executed, cause the processor to:

receive, from a companion device separate from the wearable device and comprising a second processor, a sound identifier, a spatial location, and a first pose estimate corresponding to the wearable device that are generated by the second processor of the companion device;

update the first pose estimate to generate a second pose estimate;

render spatial audio data based on the sound identifier, the spatial location, and the second pose estimate; and cause the speakers to produce sound corresponding to the spatial audio data.

21. The wearable device of claim 20, further comprising:

a motion sensor configured to:

generate first pose metadata during a first time period, wherein the first pose metadata is indicative of movement of the wearable device during the first time period, and wherein the first pose estimate is generated based on the first pose metadata; and generate second pose metadata during a second time period that follows the first time period, wherein the second pose metadata is indicative of movement of the wearable device during the second time period, and wherein the second pose estimate is generated based on the second pose metadata.

22. The wearable device of claim 20, wherein the sound identifier identifies audio data stored at the wearable device, and wherein rendering the spatial audio data comprises spatializing the identified audio data based on the spatial location and the second pose estimate.

23. The wearable device of claim 22, wherein the spatial audio data causes the speakers, when producing the sound corresponding to the spatial audio data, to emulate projection of the sound at the spatial location, wherein the spatial location is defined with respect to a pose of the wearable device that is indicated by the second pose estimate.

* * * * *